June 4, 1946.　　　G. B. ZIMMERMAN　　　2,401,678
REMOVAL OF HYDROGEN HALIDES FROM HYDROCARBON CONVERSION PRODUCTS
Filed July 5, 1943
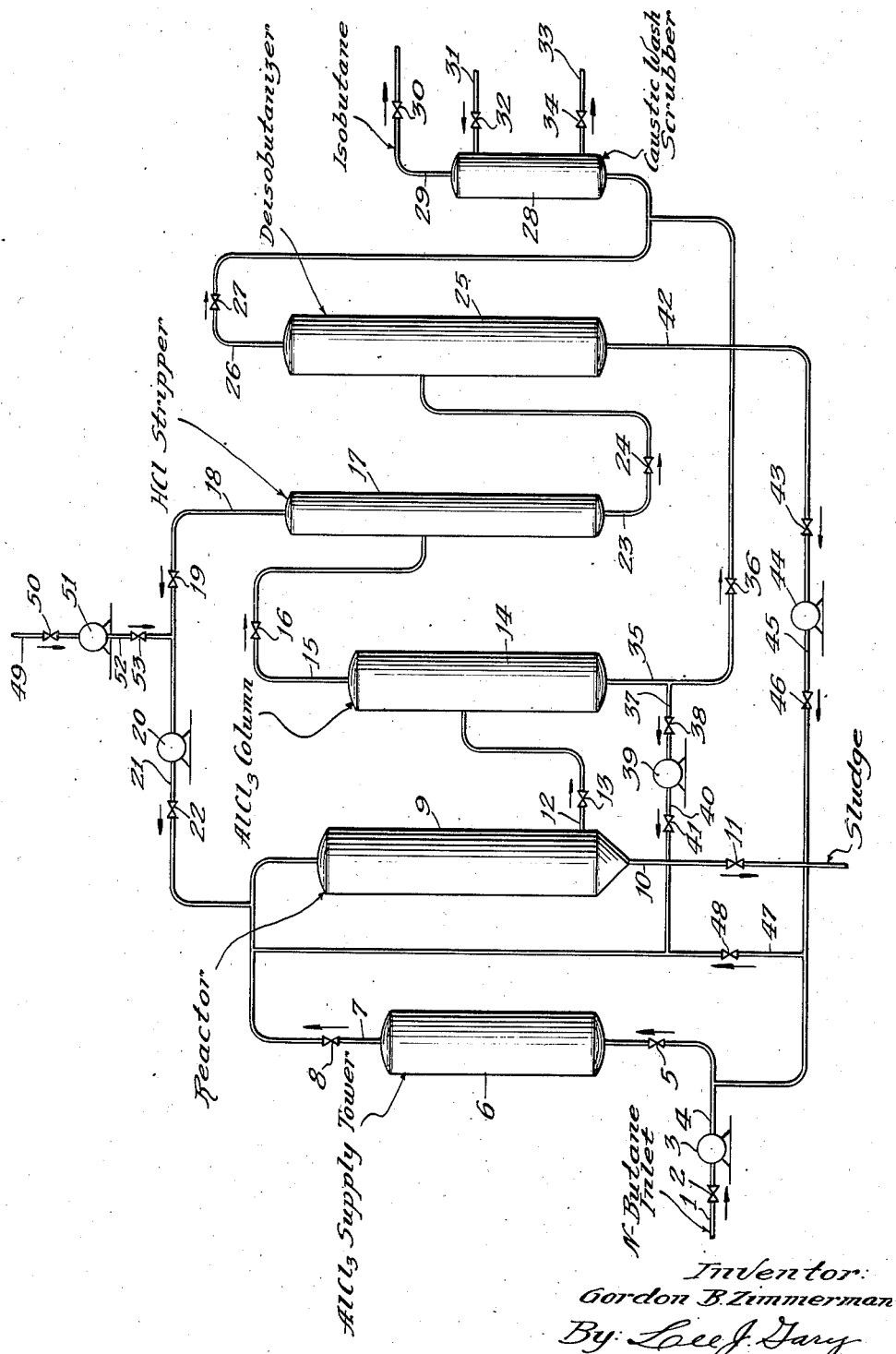
Inventor:
Gordon B. Zimmerman
By: Lee J. Gary
Attorney Patented June 4, 1946

2,401,678

UNITED STATES PATENT OFFICE 2,401,678

REMOVAL OF HYDROGEN HALIDES FROM HYDROCARBON CONVERSION PRODUCTS

Gordon B. Zimmerman, Chicago, Ill., assignor to Universal Oil Products Company, Chicago, Ill., a corporation of Delaware Application July 5, 1943, Serial No. 493,500

5 Claims. (Cl. 260—683.5)

The present invention relates to the removal of hydrogen halides from the reaction products of hydrocarbon conversion processes in which a hydrogen halide is employed.

Broadly speaking, this invention is applicable to hydrocarbon conversion processes wherein a hydrogen halide is employed as a promoter in a catalytic reaction or as a treating agent and is subsequently removed from the reaction products. The invention is particularly applicable to hydrocarbon conversion processes such as isomerization and alkylation wherein a catalyst of the Friedel-Crafts type is employed and hydrogen halide is introduced into the reaction zone to promote the action of the catalytic material.

In one broad aspect, the present invention consists of a process for the removal of hydrogen halide from the reaction products of a hydrocarbon conversion process employing a hydrogen halide therein which comprises fractionating the reaction products to separate therefrom a major portion of the hydrogen halide from the hydrocarbon, separating the remaining portion of the original mixture into a fraction containing the converted hydrocarbons and substantially all of the remaining hydrogen halide and a fraction containing the unconverted hydrocarbons, and treating the former fraction to remove the hydrogen halide therefrom.

In various hydrocarbon conversion processes such as isomerization or alkylation or paraffins employing a Friedel-Crafts type catalyst promoted by a hydrogen halide, it is extremely difficult to produce a conversion product substantially free of hydrogen halide due primarily to the solubility of the hydrogen halide in the hydrocarbon product. It is ordinarily necessary to neutralize the hydrogen halide by washing with some treating agent such as caustic. However, this entails the use of large treating equipment, large amounts of treating agents such as caustic with a high consumption of the treating agent by their reaction of a hydrogen halide with the caustic. A considerable amount of the hydrogen halide is also consumed by the treating operation which further increases the cost of the conversion process. By employing the process of my invention, the hydrogen halide removal problem is simplified to a considerable extent. A major portion of the hydrogen halide is removed by fractionation prior to the treating operation and is recycled to the process. The quantity of hydrocarbon which must be treated to remove hydrogen halide is limited to that obtained as the final product of the conversion reaction.

The operability of the present invention to hydrocarbon conversion processes is more clearly evident from the description of the accompanying drawing which illustrates in conventional side elevation one type of process in which the invention may be applied.

For the sake of simplicity, the description of the drawing is limited to a process wherein normal butane is isomerized to isobutane by contact with a catalyst comprising aluminum chloride in the presence of hydrogen chloride. However, it is not intended that this description place any undue limitations on the broad application of this invention.

Referring to the drawing, normal butane is introduced to line 1 containing valve 2 into pump 3 which discharges through line 4 containing valve 5 through a bed of granular aluminum chloride disposed within aluminum chloride supply tower 6.

A sufficient amount of aluminum chloride necessary to promote the isomerization of normal butane in a subsequent reaction zone is dissolved in the normal butane during its passage through the bed of granular aluminum chloride in supply tower 6. The temperature at which supply tower 6 is maintained will control the solubility of aluminum chloride and will vary depending upon the amount of catalyst desired in the subsequent reaction zone. This temperature will ordinarily be within the range of from about 50° to about 300° F. and more preferably within the range of about 150° to 250° F. The pressure within tower 6 will vary depending upon the temperature but will be sufficient to maintain the normal butane in substantially liquid phase. The effluent from tower 6 passes through line 7 containing valve 8 and is commingled with hydrogen chloride introduced as hereinafter set forth within reactor 9 wherein a substantial portion of the normal butane charge is converted into isobutane.

Reactor 9 may comprise a large cylindrical chamber filled with a suitable packing material such as Raschig rings, quartz chips, granular alumina, activated charcoal and various other packing materials well known to those skilled in the art.

The temperature within reactor 9 will be dependent to some extent upon the hydrogen chloride concentration in the reaction mixture but will ordinarily be within the range of about 50° to 300° F. and more preferably within the range of about 150° to 250° F. The hydrogen chloride concentration within reactor 9 will ordinarily be less than 40 mol per cent of the normal butane charge and more preferably within the range of about 2 to 20 mol per cent of the charge. The pressure within reactor 9 may vary from substantially atmospheric to about 1000 pounds per square inch. The reaction may be satisfactorily conducted in either the liquid, vapor or mixed phase.

As a result of numerous side reactions which occur simultaneously with the isomerization reaction, some liquid hydrocarbon aluminum chloride complex is formed in reactor 9. This complex passes down through the packing material and is trapped in the conical bottom section of reactor 9 and is periodically withdrawn through line 10 containing valve 11 and recovered as a product of the reaction.

The hydrocarbon stream consisting of isobutane, unconverted normal butane and higher boiling hydrocarbons and containing aluminum chloride and hydrogen chloride is withdrawn through line 12 containing valve 13 and introduced into aluminum chloride column 14 wherein it is fractionated to separate an overhead product containing most of the hydrogen chloride, unconverted normal butane and substantially all of the isobutane. This overhead product is introduced into hydrogen chloride stripper 17 from aluminum chloride tower 14 through line 15 containing valve 16. In hydrogen chloride stripper 17, a major portion of the hydrogen chloride is separated from the hydrocarbons and withdrawn overhead through line 18 containing valve 19 into pump 20 which discharges through line 21 containing valve 22 into line 7 and commingled with the normal butane as previously set forth. The hydrocarbons containing only a small amount of hydrogen chloride are withdrawn through line 23 containing valve 24 and introduced into the de-isobutanizer 25 wherein most of the isobutane and hydrogen chloride are separated from the unconverted normal butane. The separated isobutane containing small amounts of hydrogen chloride is withdrawn from de-isobutanizer 25 through line 26 containing valve 27 and introduced into scrubber 28 wherein it is contacted with a caustic solution to remove the hydrogen chloride therefrom. The isobutane stream substantially free of hydrogen chloride is withdrawn through line 29 containing valve 30 cooled and recovered as a product of the reaction.

The C₅ higher boiling hydrocarbons separated in tower 14 and containing most of the aluminum chloride introduced into said tower through line 12 is withdrawn through line 35 into line 37 containing valve 38 into pump 39 which discharges through line 40 containing valve 41 into line 47 through which it is recycled to reactor 9. In separating the C₅ and higher boiling hydrocarbons from the isobutane, hydrogen chloride and unconverted normal butane introduced into aluminum chloride column 14, a sufficient amount of unconverted normal butane is retained in the bottom fraction to provide sufficient liquid to dissolve substantially all of the aluminum chloride introduced into column 14. This method of operation permits the recycling of the aluminum chloride to the reaction zone without any of the operating difficulties ordinarily encountered when attempting to handle mixtures of aluminum chloride in hydrocarbons. By maintaining a sufficient amount of liquid to dissolve substantially all of the aluminum chloride under the conditions at which the fractionation is conducted, the deposition of aluminum chloride in the reboilers and subsequent equipment is eliminated.

To prevent a build-up of C₅ and heavier hydrocarbons in the system, a small amount is withdrawn through valve 36 into scrubber 28 wherein the aluminum chloride dissolved therein is removed by caustic wash. The C₅ hydrocarbons are then recovered along with the isobutane fraction withdrawn through line 29 containing valve 30 and may be separated from isobutane in subsequent fractionating equipment if so desired.

The unconverted normal butane separated from the isobutane in de-isobutanizer 25 is withdrawn through line 42 containing valve 43 into pump 44 which discharges through line 45 containing valve 46 into line 4 through which it is recycled to the aluminum chloride supply tower. A portion of this stream may be by-passed around the aluminum chloride supply tower through line 47 containing valve 48 into line 7.

The hydrogen chloride used in starting the operation and any additional make-up needed during the operation is introduced through line 49 containing valve 50 into pump 51 which discharges through line 52 containing valve 53 into line 18. The caustic is introduced in scrubber 38 through line 31 containing valve 32 and is withdrawn through line 33 containing valve 34.

The removal of the hydrogen chloride may also be accomplished by the use of other suitable liquid treating agents such as sodium phosphate or solid absorbents such as activated charcoal, bauxite, silica gel, etc.

I claim as my invention:

1. In the process of isomerizing normal butane wherein the normal butane is contacted with a metal halide catalyst in the presence of a hydrogen halide and the latter as well as some of the catalyst is removed from the zone of reaction along with the reaction products, the method of recovering the reaction products substantially free of hydrogen halide and catalyst which comprises fractionating the reaction products to separate a C₄ fraction containing the hydrogen halide from a heavier hydrocarbon fraction formed in the process containing the metal halide catalyst, separating the bulk of the hydrogen halide from the C₄ fraction by fractionation, further fractionating the C₄ fraction to separate an isobutane fraction, containing the remainder of the hydrogen halide, from the unconverted normal butane, returning the normal butane and at least a portion of said heavier hydrocarbon fraction to the isomerization step, combining the isobutane fraction with the remainder of said heavier fraction and subjecting the mixture to caustic treating to remove the hydrogen halide and metal halide catalyst.

2. The process defined in claim 1 further characterized in that said metal halide catalyst comprises aluminum chloride and said hydrogen halide comprises hydrogen chloride.

3. An isomerization process which comprises isomerizing a paraffin hydrocarbon in a reaction zone in the presence of a metal halide catalyst and a hydrogen halide promoter for said catalyst; fractionating the effluent reaction products to separate a relatively low boiling fraction comprising isomerized paraffin, unconverted paraffin, and hydrogen halide from a higher boiling fraction comprising heavier hydrocarbons formed during the reaction and dissolved metal halide catalyst; further fractionating said low boiling fraction to separate the bulk of the hydrogen halide therefrom and recycling the separated hydrogen halide to said reaction zone; further fractionating the remainder of said low boiling fraction to separate said isomerized paraffin from said unconverted paraffin; recycling said unconverted paraffin and a portion of said higher boiling fraction to said reaction zone; and introducing the separated isomerized paraffin and the remainder of said higher boiling fraction into a treating zone and therein effecting complete removal of hydrogen halide and metal halide from the hydrocarbons by reaction with a caustic solution.

4. The process of claim 3 wherein said metal halide comprises aluminum chloride and said hydrogen halide comprises hydrogen chloride.

5. The process of calim 3 wherein said paraffin hydrocarbon to be isomerized comprises normal butane.

GORDON B. ZIMMERMAN.